(12) United States Patent
Johnson

(10) Patent No.: US 6,470,108 B1
(45) Date of Patent: Oct. 22, 2002

(54) OPTICAL SWITCHING DEVICE AND METHOD

(75) Inventor: A. David Johnson, San Leandro, CA (US)

(73) Assignee: TiNi Alloy Company, San Leandro, CA (US)

(*) Notice: Subject to any disclaimer, the term of this patent is extended or adjusted under 35 U.S.C. 154(b) by 0 days.

(21) Appl. No.: 09/558,893

(22) Filed: Apr. 26, 2000

(51) Int. Cl.[7] .................. G02B 26/08; G02B 7/182
(52) U.S. Cl. .................. 385/18; 385/17; 359/298; 359/872
(58) Field of Search ............ 385/16–18; 359/298, 359/872

(56) References Cited

U.S. PATENT DOCUMENTS

| | | | |
|---|---|---|---|
| 5,061,914 A | 10/1991 | Busch et al. | 337/140 |
| 5,825,275 A | 10/1998 | Wuttig et al. | 337/139 |
| 6,072,617 A | 6/2000 | Henck | 359/237 |
| 6,075,239 A | * 6/2000 | Aksyuk et al. | 250/229 |
| 6,195,478 B1 | * 2/2001 | Fouquet | 385/17 |
| 6,229,640 B1 | * 5/2001 | Zhang | 359/290 |

* cited by examiner

Primary Examiner—Akm E. Ullah
Assistant Examiner—Jerry T Rahll
(74) Attorney, Agent, or Firm—Richard E. Backus

(57) ABSTRACT

A method of measuring with high accuracy the composition of shape memory alloy elements that are sputter deposited in thin film form. An element of known composition is polished with a flat surface. An element of unknown composition is sputter deposited onto the surface. Miniature openings are made by photography in the unknown layer, exposing an area of the known substrate. With adjacent areas of the two samples then only microns apart, accurate measurements of the compositions are made by comparing the X-ray spectra resulting from an electron beam scanning across the two areas.

20 Claims, 5 Drawing Sheets

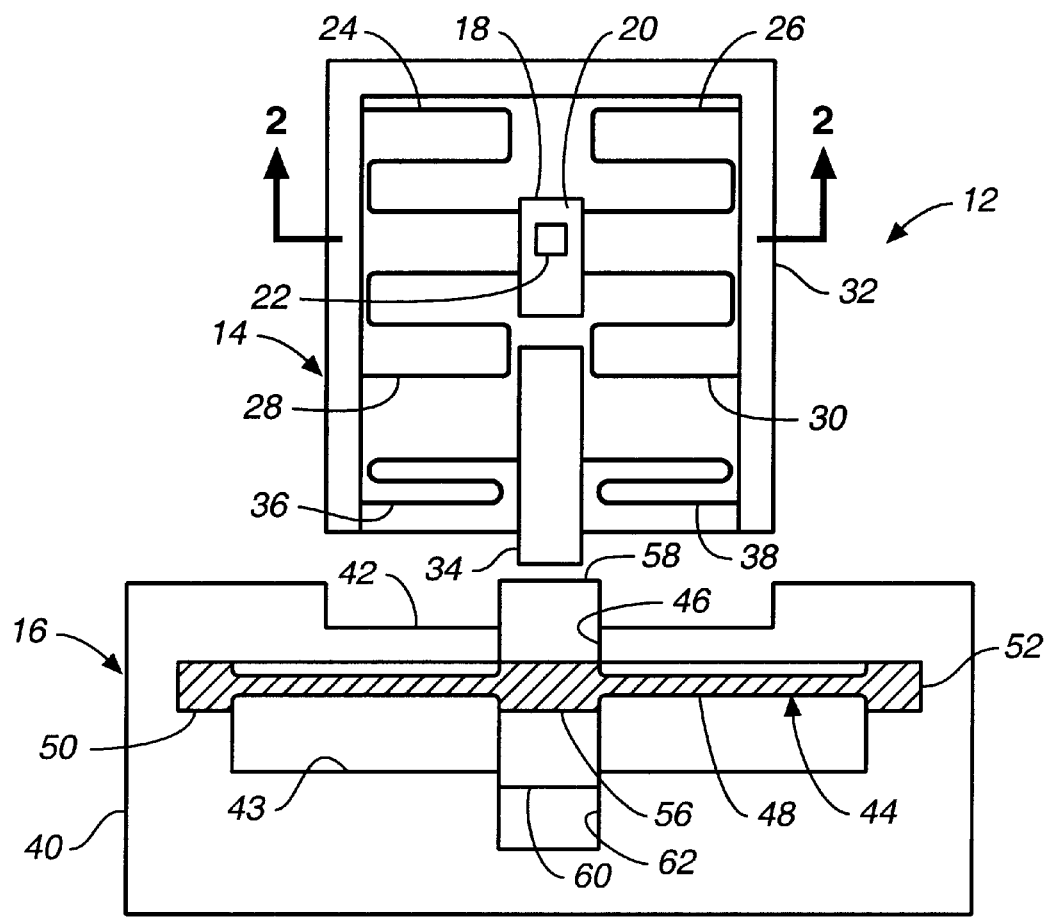
FIG._1
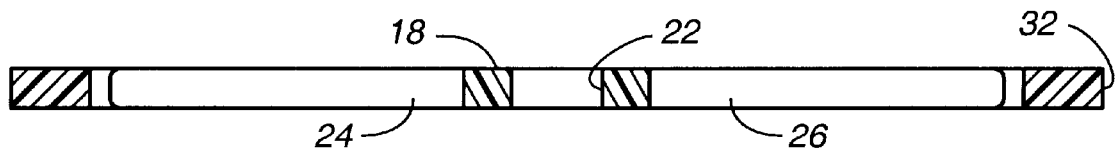
FIG._2

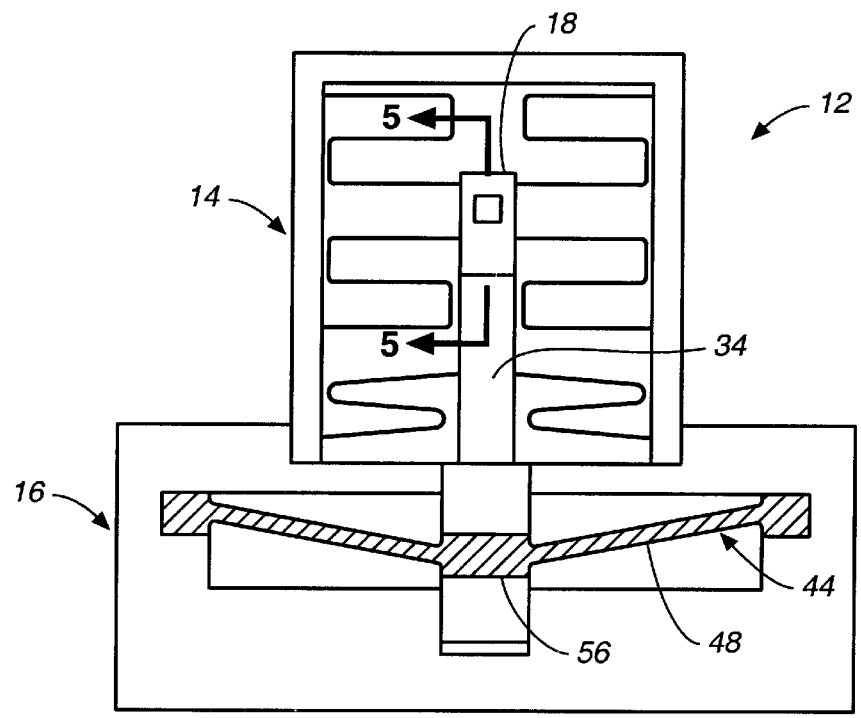
FIG._3
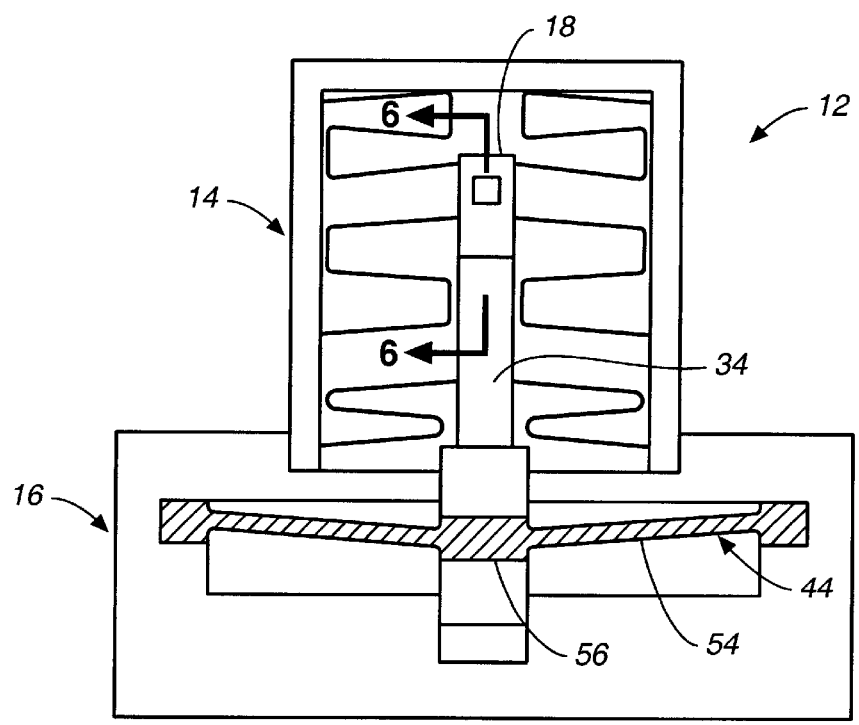
FIG._4

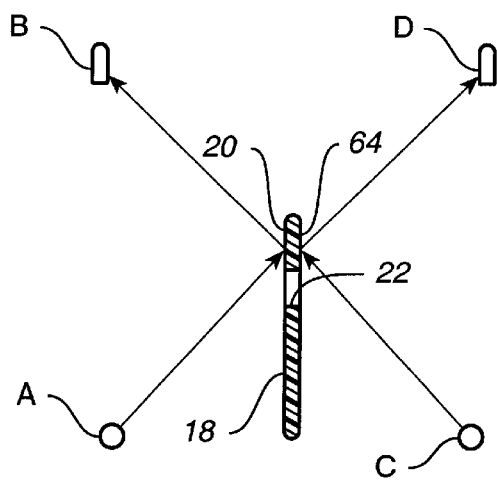
FIG._5
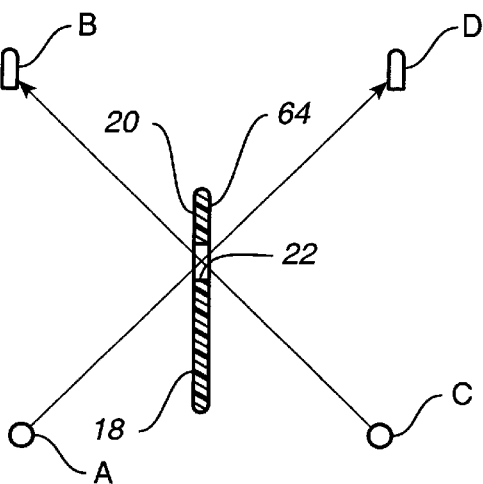
FIG._6
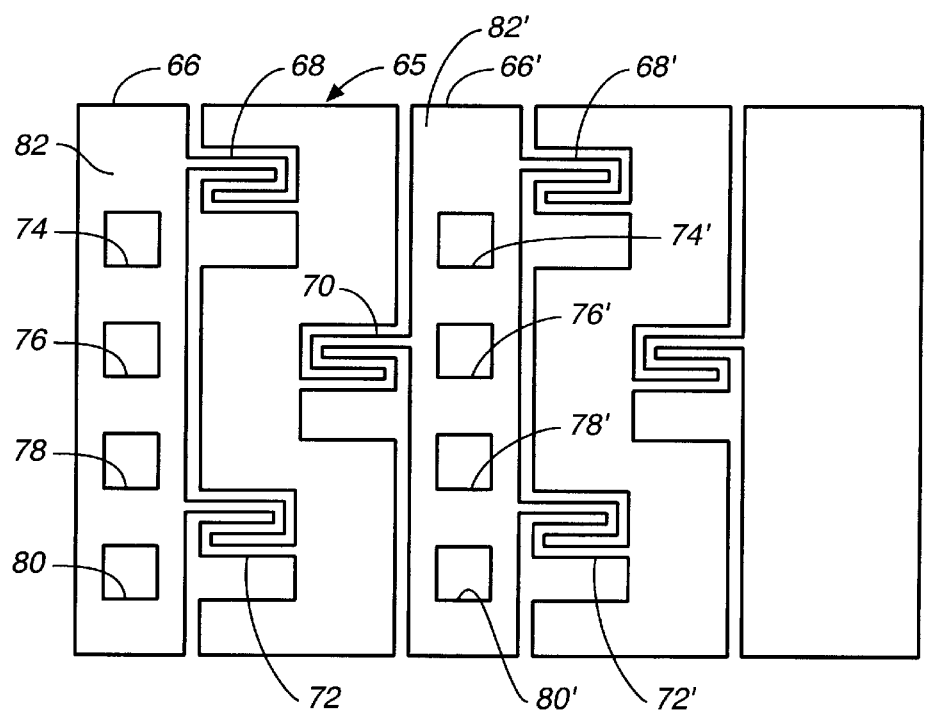
FIG._7

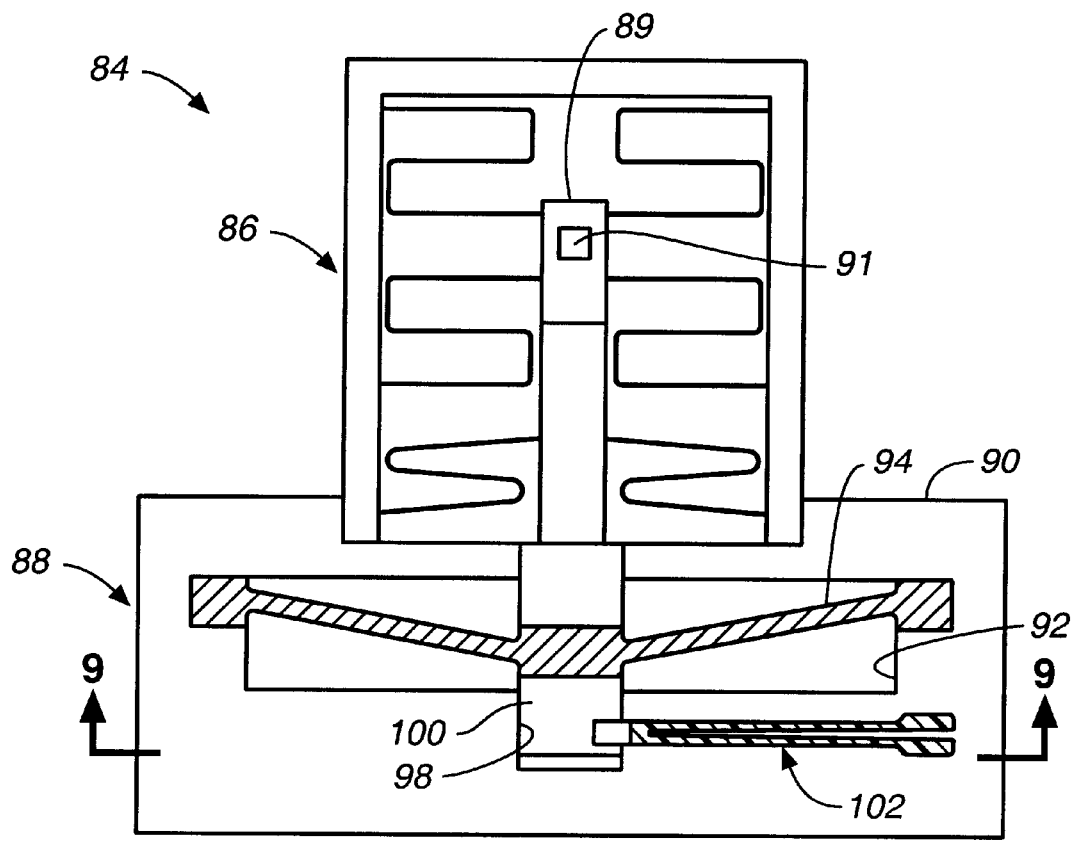
FIG._8
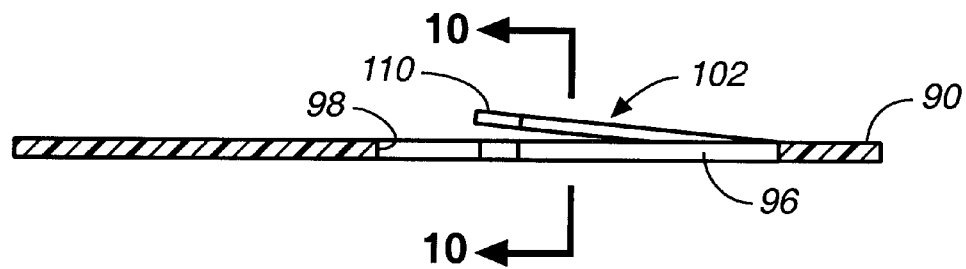
FIG._9

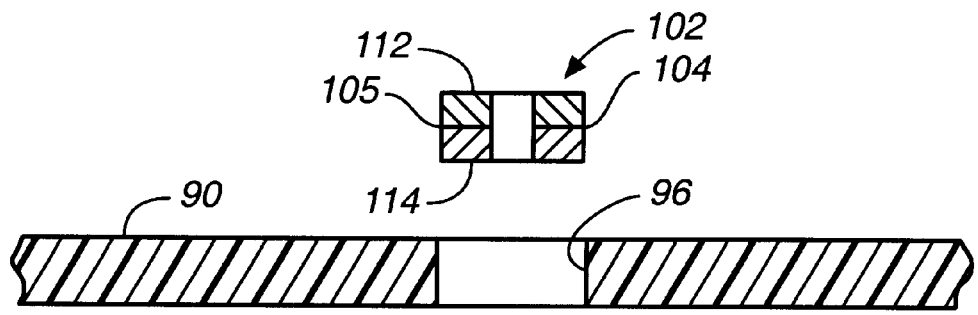
FIG._10
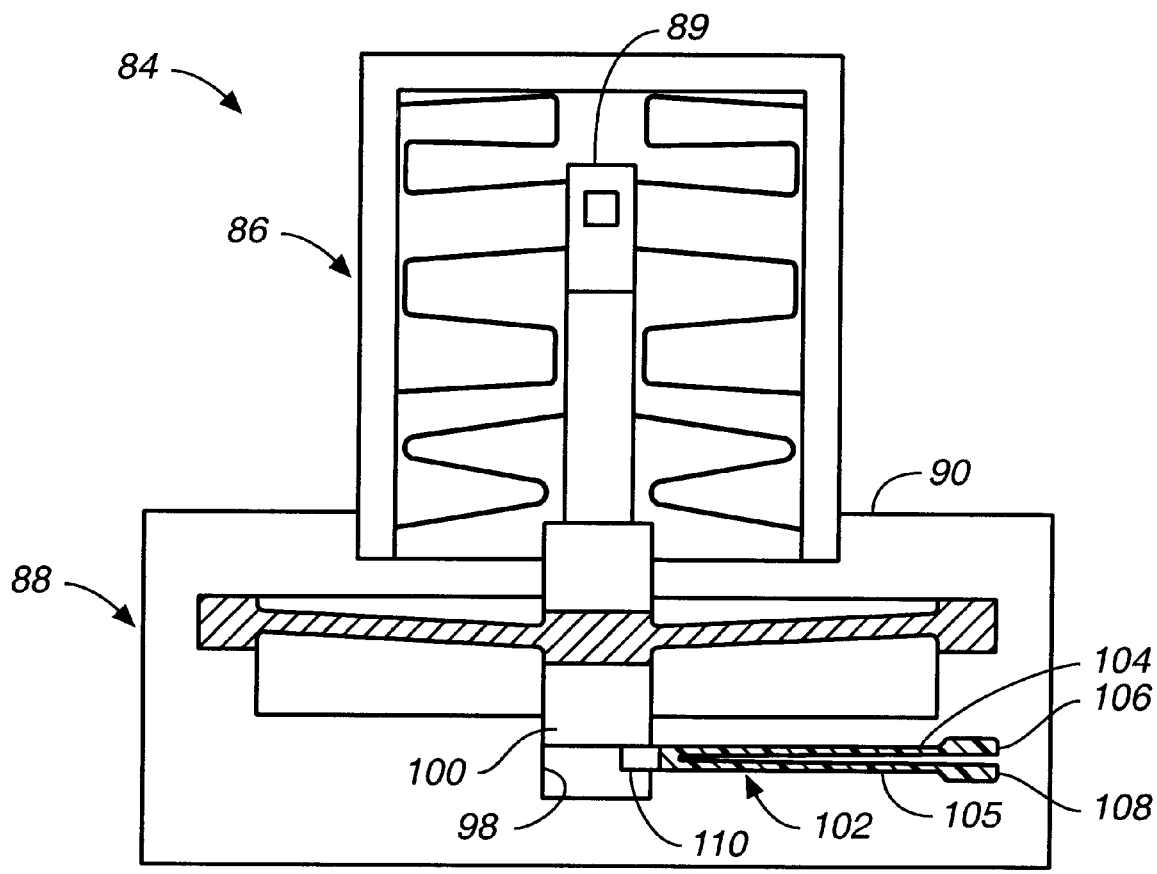
FIG._11

OPTICAL SWITCHING DEVICE AND METHOD

BACKGROUND OF THE INVENTION

1. Field of the Invention

This invention relates in general to optical switching for information and data transmission systems using light signals, such as optical fiber systems.

2. Description of the Related Art

Conventional optical fiber systems transmit information and data by laser beams through optical fibers that are bundled together. These optical fiber systems have been developed to the extent that they can efficiently and with high capacity transmit various forms of information such as voice, television and data packets.

The bandwidth of signals being transmitted through conventional fiber optic systems is growing due to increasing consumer and business demand and technological developments. The optical fibers are capable of transmitting large volumes of information over long distances, and optical fiber cables can contain large numbers of individual fibers, with as many as a thousand fibers in a single cable. These systems require methods for switching the light channels so that individual light signals are properly routed through the information networks. Switching is required where a given channel may become overloaded, where components may become damaged, or where sub-systems may require replacement.

One conventional method of switching optical channels is to convert each optical signal to an electronic signal. The electronic signal is then redirected along a different path and reconverted to an optical signal which is inserted back into an optical fiber. However, this switching method is relatively expensive and has limitations in speed and bandwidth. Another drawback is that these expensive systems require frequent replacement. Digital Wavelength Multiplexing (DWM) technology has been developed by which several wavelengths of light can be transmitted in a single fiber. Where DWM has been installed, single-frequency electronic circuits must be replaced with more expensive electronics capable of handling the multiple frequencies. This new DWM technology means that a user's existing equipment must be upgraded to the new technology, which is very expensive.

It would be desirable to provide an optical switching system and method which would enable the switching of a large number of channels in an optical information network without the requirement of optical-to-electronic conversion and which would also not require system upgrades for handling the multiple frequencies of DWM transmissions.

OBJECTS OF THE INVENTION

It is a general object of the present invention to provide new and improved devices and methods for the switching of optical light signals. A further object is to provide methods of making optical switching devices which preserve optical alignment throughout the life of the devices. A further object is to provide devices and methods for the optical switching of light signals by the movement of mirrors. A further object is to provide optical light switching devices of the type described which can be fabricated sufficiently small to be a part of a micro-electrical mechanical system (MEMS).

The foregoing and additional objects and features of the invention will appear from the following description of the invention taken in conjunction with the accompanying drawings.

BRIEF DESCRIPTION OF THE DRAWINGS

FIG. 1 is a top plan view of pre-assembled components of an optical switching device in accordance with one embodiment of the invention.

FIG. 2 is an enlarged cross sectional view taken along the line 2—2 of FIG. 1.

FIG. 3 is a top plan view showing the optical switching device of FIG. 1 with the components assembled and with the actuator and mirror in their neutral positions.

FIG. 4 is a top plan view similar to FIG. 3 showing the components in their activated positions.

FIG. 5 is an enlarged cross sectional view taken along the line 5—5 of FIG. 3 showing the input and output paths of two light beams incident on opposite sides of the mirror when the device is neutral.

FIG. 6 is an enlarged cross sectional view taken along the line 6—6 of FIG. 4 showing the paths of two light beams which pass through an aperture in the mirror when the device is activated.

FIG. 7 is a top plan view of an optical switch device in accordance with another embodiment providing an array of mirrors for use with one or more actuator assemblies.

FIG. 8 is a top plan view of an optical switch in accordance with another embodiment having a latch which is shown in a first bistable position.

FIG. 9 is cross sectional view taken along the line 9—9 of FIG. 8 showing details of the latch.

FIG. 10 is an enlarged cross sectional view taken along the line 10—10 of FIG. 9.

FIG. 11 is a top plan view similar to FIG. 8 showing the switch in a second bistable position.

DESCRIPTION OF THE PREFERRED EMBODIMENTS

The various embodiments of the invention are for typical use in optical fiber systems for transmitting video, voice and data information. Optical signals comprising light beams are transmitted through individual fibers which are bundled together into optical fiber cables. A single fiber can transmit multiple frequencies or wavelengths of light using Digital Wavelength Multiplexing.

The several embodiments of the invention provide method and apparatus for optically switching light signals. In its broadest form, one preferred embodiment of the invention provides an optical switch method and device in which a high degree of optical alignment is preserved throughout the life of the device. The method is carried out by the device 12 described to FIGS. 1–6.

Device 12 is micromachined from a micro-substrate or wafer comprising a single piece of crystalline material, preferably silicon. Such a crystalline material is fabricated by known processes to form polished plane surfaces or facets which remain in perfect alignment as long as no stresses are applied. In the invention mirror surfaces are formed by the facets of the crystal so that optical alignment of the mirror surfaces are maintained with accuracies within a fraction a wavelength. The resulting mirror surfaces are used in the various embodiments of the invention to reflect light beams from input paths to output paths so that optical alignment of the paths is preserved throughout the life of the device. This obviates the need for "tuning" the device after it is fabricated, thus reducing manufacturing costs. The invention also enables the manufacture of arrays with relatively large numbers of individual mirrors for reflecting separate light beams. Each of the reflected beam paths will be perfectly aligned in that all of the mirrors are made from the same surface of a single silicon wafer.

FIG. 1 illustrates optical switching device 12 with its components in pre-assembled relationship. Device 12 comprises a mirror assembly 14 and actuator assembly 16, both of which are micromachined from the same single-crystal substrate of silicon. The micromachining is carried out by the use of known photolithographic patterning and chemical etching techniques in a manner which produces no stresses in the Si substrate.

Mirror assembly 14 includes a rectangular mirror 18 comprised of an Si substrate and, on at least one surface, a coating 20 of reflective material such as aluminum to provide an optically flat mirror surface. An aperture 22 penetrates completely through the Si substrate and Al coating. The aperture in the mirror is a form of "optical discontinuity" on the mirror surface.

Portions of the Si substrate surrounding mirror 18 are etched away for micromachining four flexural supports 24–30. Vertical sidewalls for the supports are made by using the known deep reaction ion etching (DRIE) process. Each flexural support is formed with a serpentine shape and has one end anchored to a side of the mirror and another end anchored to a U-shaped frame 32 which is also formed from the Si substrate. The shapes of the flexural supports provide sufficient resistance to sidewards forces for holding the mirror in its centered position, but which have less resistance to up and down forces to enable longitudinal movement of the mirror relative to the frame.

Mirror assembly 14 further includes an intermediate slider 34 which is also micromachined from the Si substrate. A pair of flexural supports 36, 38 micromachined from the substrate are joined at their inner ends with the slider and at their outer ends with the frame. These supports are serpentine shaped so as to center the slider in a sideways direction while enabling longitudinal movement.

Actuator assembly 16 is comprised of a frame 40 which is micromachined from the same single-crystal substrate used to make the mirror assembly. A recess 42 is etched away at the top of the frame for seating the lower end of the mirror assembly when the two components are assembled together in the manner shown in FIG. 3. A rectangular cavity 43 is micromachined within frame 40, and an opening 46 is formed through the top of the frame between the cavity and recess 42.

Cavity 43 contains an SMA actuator 44 which is comprised of a microribbon 48 of shape memory alloy (SMA) film. A suitable SMA material is TiNi, which can be sputter-deposited in an amorphous state as a thin film over the Si substrate. The SMA film is then heat treated to create a crystalline structure. The process for forming such a thin film of SMA material is disclosed in the Busch et al. U.S. Pat. No. 5,061,914, the disclosure of which is incorporated herein.

Microribbon 48 has opposite ends 50, 52 which are anchored in frame 40. Si material below the microribbon is etched away from the substrate. This enables the microribbon to bend in the plane of the wafer within cavity 43 as the SMA microribbon either contracts or stretches as it is heated through and from its phase change transition temperature. A boss 56 is formed in the center portion of the microribbon. The top and bottom sides of the boss are joined with respective upper and lower sliders 58, 60, which are etched from the Si crystal. Upper slider 58 is sized to slide in reciprocating movement along opening 46 and lower slider 60 is sized to slide in reciprocating movement within a recess 62 in the frame at the bottom of cavity 43.

Mirror 18, sliders 34, 58 and 60 and actuator 44 are shaped and precisely positioned so that when the mirror and actuator assemblies are fitted together boss 56 pushes against upper slider 58 forcing it upwardly against intermediate slider 34 and the resisting force of flexural supports 36, 38 until the upper end of the intermediate slider is adjacent to, but not touching, the lower end of mirror 18. The downward reaction force from the flexural supports causes sliders 34 and 58 to press against boss 56 and move microribbon 48 downwardly to the position shown in FIG. 3. FIG. 3 shows the neutral positions of the components forming the mirror and actuator assemblies. In this neutral position the SMA actuator is deactivated and the mirror is not subject to any forces, excepting gravity.

As long as the mirror stays in this neutral position it will remain in near perfect optical alignment so that input light beams at known angles of incidence will be spectrally reflected off the mirror at precisely aligned output paths. This alignment will be maintained within a fraction of a wavelength throughout the life of the device. Any slight deviation in the mirror due to gravity will be compensated for by the fact that all other mirrors in an array formed from the same substrate will be affected to the same slight extent, and thus any such deviations will be negligible.

The mirror and actuator assemblies are assembled together when the SMA material is at a temperature below the material's phase change transition temperature. At this temperature the SMA can be plastically deformed, and in this embodiment the deformation is caused by the combined bias forces of flexure supports 36, 38 which act downwardly through the sliders and actuator boss to prestress and stretch the arms of the actuator bridge in the manner shown in FIG. 3. This is the neutral position where the mirror is not touched by slider 34 and input light beams are accurately reflected off the mirrored surface along output paths as shown in FIG. 5.

Device 12 is activated to switch the output light signal paths from that shown in FIG. 5 by heating actuator 44 through the SMA material's phase change transition temperature. The actuator can optimally be heated by electrical resistance heating from a source of power in a micro-electric circuit. Current flow would be from one of the anchor ends 50 or 52 across the microribbon to the opposite anchor end. The heating cycles can be controlled by means of a suitable computer. The transition temperature is predetermined in accordance with the particular composition of the allow which is employed. For a material of TiNi alloy, which is nearly equal atomic weights of Titanium and Nickel, the transition temperature is approximate at $100^-$ C. As used herein, the phrase "heated through the transition temperature" includes both the case of heating the material to within the relatively narrow temperature range in which the phase change takes place, or heating it to a temperature above that range.

As the phase change of the SMA from martensite to austenite occurs, the microribbon 48 changes from its low temperature shape shown in FIG. 3 to its memory shape shown in FIG. 4. This shape change takes place by contraction so that boss 56 pushes the sliders up until the top end of slider 34 engages and pushes the mirror up to the activated position shown in FIG. 4. At this position aperture 22 is brought into register with the paths of the input light beams (FIG. 6), which are no longer reflected but pass through the aperture along output paths. The light in the output paths can be routed by suitable means, not shown, into the fiber optic network, or the beams could be directed to light sensors, not shown, as required by the particular application.

In a broad aspect of the invention, mirror 18 can be moved by any suitable type of actuator, such as piezoelectric, a solenoid, heating a bimetal beam, or by an electrostatic field. Actuation by an SMA material in the manner described is optimum for use in microdevices because of the relatively large strokes and forces that are characteristically achieved from the SMA phase transformation. Piezoelectric systems are fast but do not provide large displacements or forces. Thermal expansion such as from bimetal devices is relatively slow. The scaling down of solenoids or other electromagnetic devices to micro sizes is not feasible because of the difficulty in obtaining sufficient actuation force scaled-down, as well as the complexities of manufacture.

The single mirror 18 can be used for switching two light beams along separate input paths by forming reflective coatings 20, 64 on both sides of the substrate, as illustrated in FIGS. 5 and 6. In the neutral position of the mirror shown in FIG. 5, input light beams from sources A and C are directed toward respective sides of the mirror surface from which they spectrally reflect off along respective output paths to B and D. The beam paths are switched upon activation by heating the SMA actuator through its transition temperature. This moves the mirror to the position shown in FIG. 6 where both beams pass through aperture 22. This switches input beam A to output D, and simultaneously switches input C to output B.

The embodiment of FIG. 7 enables fabrication on a single Si wafer 65 of an N×M array where N is a plurality of input beam channels and M is a plurality of output beam channels. A plurality, shown as two, of mirror substrates 66, 66' are etched from the wafer in side-by-side relationship. Also etched from the Si wafer are serpentine-shaped flexure supports 68, 70 and 72 which hold the substrates against sideways movement but permit longitudinal movement in the manner explained for the embodiment of FIGS. 1–6. Four spaced-apart apertures 74–80 are formed through each substrate, and one or both sides of the substrate have a coating 82, 82' of a reflective material such as Al. When combined with one or more actuator assemblies as described for the embodiment of FIGS. 1–6, each mirrored substrate surface can simultaneously switch four light beams so that a total of eight light beams can be switched for the array shown in FIG. 7. The number of light beams that are switched can be increased by etching additional mirrored substrates on the same wafer, or by providing longer substrates with additional apertures.

The matrix of mirrored surfaces and apertures in the embodiment of FIG. 7 enables a single actuator to switch multiple light beams. All of the mirrored surfaces from which the reflections take place remain in perfect optical alignment because they are all made from the same Si crystal.

FIGS. 8–11 illustrate an embodiment providing an optical switching device 84 which is bistable in operation. That is, the device can be maintained in a reflective state, or latched in a non-reflective state, without power being required for either state.

Optical switching device 84 is comprised of mirror assembly 86 and actuator assembly 88, both of which are micromachined from the same single-crystal Si wafer. Mirror assembly 86 is fabricated in accordance with the embodiment of FIG. 1, and includes a mirror 89 formed with an aperture 91. Actuator assembly 88 is comprised of a frame 90 formed with a cavity 92 in which an actuator comprising SMA microribbon 94 is formed, also in accordance with the embodiment of FIG. 1. Additionally, the Si substrate in frame 90 is etched to form a narrow channel 96 (FIGS. 9 and 10) which opens into a small cavity 98 in which a lower slider 100 (formed at the lower edge of the SMA actuator) reciprocally slides.

Within channel 96 a controllable bimorph latch 102 is fabricated. The latch is in the shape of an elongate tuning fork having a pair of side-by-side arms 104, 105 separated by a narrow gap and with the proximal ends 106, 108 of the arms anchored in frame 90 (FIG. 11). The latch tip 110 joins the two arms together at their distal ends.

The latch is fabricated in accordance with the teaching of U.S. Pat. No. 5,825,275 to Wuttig, the disclosure of which is incorporated herein. The latch is a bi-morph actuator and comprises a composite beam of SMA film 112 bonded on top of an Si substrate film 114. The substrate film has a coefficient of expansion greater than the coefficient of expansion of the SMA film.

During the joining of mirror assembly 84 with actuator assembly 88, latch 102 is actuated so that it bends sufficient to lift its tip and provide clearance from slider 100. A computer control, not shown, is operated to direct a current into the SMA for resistance heating through the transformation temperature. The current flow through the SMA film is into one of the arms 104, 105, across the tip 110 and back in the other arm to the control circuit.

As the martensitic to austenitic phase change of the SMA material occurs, the volume of the SMA film contracts, causing an increase in stress in the Si substrate. This volume change results in bending of the composite beam in a direction out of the plane of the Si wafer, as shown in FIG. 9. In this position the tip 110 of the composite beam is lifted out of channel 96 so that it does not become engaged with lower slider 100 when the latter is pushed down into cavity 98 as the mirror assembly is seated down into the top of the actuator assembly. Power to the latch is then switched off allowing the composite beam to bend back until tip 110 rests on the top of slider 100. With the latch not engaged at this stage, and no power to the main actuator, the input light beam reflects off of the mirror at a point above aperture 91. This is the first bistable position of the switch.

For switching to the second bistable position and redirecting the light signal, the computer system first powers main actuator 94 by directing current through the SMA material to heat it through its transition temperature. This causes the microribbon to contract and push the sliders and mirror 89 upwardly to a point where the light beam passes through the aperture (FIG. 11). Because the composite beam of latch 102 is not energized, its elastic memory causes tip 110 to slip off the end of the slider and into cavity 98. Next the main actuator 94 is de-energized so that its SMA material relaxes, permitting the slider to start moving back down under the bias force of the flexure connections. The tip end of the latch prevents the slider from returning all of the way, as shown in FIG. 11, so that the mirror stays in its non-reflective position. The switch will remain in this state with the light beam passing through the aperture and with no power on either the main actuator or latch.

For switching to the second bistable position and redirect the light signal, the computer system first powers main actuator 94 by directing current through the SMA material to heat it through its transition temperature. This causes the actuator bridge to contract and push the sliders and mirror 89 upwardly to a point where the light beam passes through the aperture (FIG. 11). Because the composite beam of latch 102 is not energized, its elastic memory causes tip 110 to slip off the end of the slider and into cavity 98. Next the main actuator 94 is de-energized so that its SMA material relaxes, permitting the slider to start moving back down under the bias force of the flexure connections. The tip end of the latch prevents the slider from returning all of the way, as shown in FIG. 11, so that the mirror stays in its non-reflective position. The switch will remain in this state with the light beam passing through the aperture and with no power on either the main actuator or latch.

The mirror is returned to its first bistable position of FIG. 8 by first energizing the main actuator so that it begins moving up to remove pressure on the latch tip. Then the latch is energized to move the latch tip out of the path of movement of the slider, and the latch remains energized while power is then removed from the main actuator. This permits the main actuator and sliders to return to their first bistable positions, and enables the flexure supports to move the mirror back down to the reflective state. The latch is then de-energized so that the switch will remain in this state without application of power.

While the foregoing embodiments are at present considered to be preferred, it is understood that numerous variations and modifications may be made therein by those skilled in the art and it is intended that the invention includes all such variations and modifications that fall within the true spirit and scope of the invention as set forth in the appended claims.

What is claimed is:

1. A method of accurately measuring the composition of shape memory alloy elements that are sputter deposited in thin film form, comprising the steps of providing an element of known composition having a polished flat surface, sputter depositing an element of unknown composition over a first area onto the surface, forming a micron-size opening in the unknown layer to expose a second area of the known composition element, scanning an electron beam across the first and second areas, comparing X-ray spectra from the element of unknown composition in the first area with X-ray spectra from the element of known composition in the second area, and computing the compositions of the elements as a function of the X-ray spectra comparison.

2. A method as in claim 1 and further comprising the steps of sputter depositing onto a substrate from targets of Ti and Ni elements and a target of a material comprised of an element other than Ti and Ni which when alloyed with Ti and Ni can produce a shape memory effect, and computing responsive to said computation an additional amount of said material to be sputtered sufficient to maintain sum of the percentage composition of the elements that are from the left side of the periodic table at 50 atomic percent, and the sum of percentage composition of the elements that are from the right side of the periodic table comprise the remaining 50 atomic percent.

3. A method as in claim and further comprising the steps of iteratively repeating the step of computing the compositions, and statistically determining responsive to the iteratively repeating step the composition measurement to an accuracy within 0.1%.

4. In an information transmission system using light beams, a method of optically switching a light beam comprising the steps of: providing a substrate having a surface with a flat mirror and an optical discontinuity, enabling the mirror to be located at a neutral position where the light beam is directed along an input path N with the light beam being reflecting from the mirror along a first output path M1, moving the mirror to an activated position where the path N is in register with the optical discontinuity and the light beam is redirecting from the optical discontinuity to a second output path M2.

5. The method of claim 4 in which the optical discontinuity comprises an aperture, and enabling the light beam to pass through the aperture when the mirror is in the activated position.

6. The method of claim 4 in which the step of moving the substrate is carried out by providing an actuator element having a first position, moving the actuator element from the first position and causing the actuator element movement to push the mirror to the activated position.

7. The method of claim 6 and further comprising the step of moving the actuator element away from the mirror after the mirror reaches its neutral position where the mirror is isolated from stress and movement originating from the actuator element.

8. The method of claim 6 and further comprising the step of releasably latching the mirror in the activated position.

9. The method of claim 4 and further comprising the step of providing an actuator comprised of a shape memory alloy material which is characterized in undergoing a crystalline phase change accompanied by shape change responsive to being heated through a transition temperature range, and causing the shape change of the actuator to move the mirror to the activated position.

10. The method of claim 9 and further including the step of holding the mirror in the first bistable position isolated from stress and movement originating from the actuator.

11. The method of claim 10 and further including the step of selectively latching the mirror in the second bistable position.

12. The method of claim 11 and further including the step of providing a bimorph beam comprised of a substrate and a layer comprised of a shape memory alloy material bonded to the substrate with the the bimorph beam which bends away from a latch position which latches the mirror responsive to heating of the shape memory alloy material through a phase change transition temperature, heating the shape memory alloy material through the transition temperature, and the step of selectively latching the mirror is carried out by cooling the shape memory alloy material to a temperature below transition temperature while enabling the bimorph beam to return to the latch position.

13. A method for the bistable switching of an input light beam in an optical transmission system, the method comprising the steps of: providing a substrate having a surface with a flat mirror and an aperture extending through the mirror and substrate, holding the mirror in a first bistable position where the light beam is reflected from the mirror along a first output path, providing an actuator comprising a moveable element, activating the actuator to cause the moveable element to push the mirror to a second bistable position where the light beam passes though the aperture along a second output path, and deactivating the actuator while holding the mirror in the second bistable position.

14. A micro electromechanical device for switching the path of a light beam, the device comprising the combination of: a substrate formed of a crystalline material and having at least one crystalline facet which has a planar surface, the surface having a mirror, the substrate being mounted for movement to and from a neutral position where only the force of gravity and an elastic restoring force counteracting the gravity act on the substrate, the substrate in the neutral position holding the mirror at an orientation where the mirror is in register with the input path and the light beam is reflected from the mirror along a first output path.

15. A micro electromechanical device for switching the path of a light beam, the device comprising the combination of: a substrate formed of a crystalline material and having at least one crystalline facet which has a planar surface, a reflective coating on the surface forming a mirror, the mirror being mounted for movement to and from a neutral position where the mirror is in register with the light beam which is reflected from the mirror along a first output path, the substrate and mirror having an aperture, and the substrate and mirror are mounted for movement to and from an activated position where the light beam passes through the aperture along a second output path.

16. A micro electromechanical device as in claim 15 which further comprises an actuator having an operating element which moves responsive to a first control signal from a first position toward a second position while moving the mirror to the activated position, and the operating element is enabled for return to the first position responsive to a second control signal, with the operating element in its first position being out of contact with the mirror whereby the mirror is isolated from stress and movement originating from the actuator.

17. A micro electromechanical device as in claim 16 in which the actuator is comprised of a shape memory alloy material which is characterized in undergoing a crystalline phase change accompanied by shape change from a low temperature shape to a memory shape responsive to being heated through a transition temperature range, and the actuator has an element disposed to move the mirror to the activated position responsive to the shape change to the memory shape.

18. A micro electromechanical device as in claim 17 in which the actuator comprises a microribbon.

19. A micro electromechanical device for switching the path of a light beam in an optical transmission system, the device comprising a substrate having a surface with a flat mirror and an aperture extending through the mirror and substrate, the mirror being moveable between first and second bistable positions, the mirror in the first bistable position reflecting the light beam along a first output path, and an actuator having an operating element which is moveable to push the mirror to the second bistable position where the light beam passes through the aperture along a second output path.

20. A micro electromechanical device as in claim 18 which includes a bimorph beam comprised of a substrate and a layer formed of a shape memory alloy material bonded to the substrate with the the bimorph beam being bending away from a latched position responsive to heating of the shape memory alloy material through a phase change transition temperature, the bimorph beam having a portion which latches the mirror in the second bistable position when the beam is in the latched position.

* * * * *

UNITED STATES PATENT AND TRADEMARK OFFICE
CERTIFICATE OF CORRECTION

PATENT NO. : 6,470,108 B1 Page 1 of 1
DATED : October 22, 2002
INVENTOR(S) : A. David Johnson It is certified that error appears in the above-identified patent and that said Letters Patent is hereby corrected as shown below:

<u>Title page,</u>
Item [57], ABSTRACT,
Delete the entire paragraph and substitute the following paragraph:

-- An optical switching device and methods of fabrication and operation for use in information transmission systems using light beams as in optical fiber networks. The fabrication method forms an optical switching device with a mirror on a planar facet of a substrate made of crystalline material such as silicon. Highly precise optical alignment of the mirror is created and maintained throughout the life of the device. The optical switching method involves a substrate having a flat mirror and an aperture formed though the mirror and substrate. The mirror is moved between a light reflective neutral position where the mirror is substantially isolated from external stresses and a nonreflective position where input light beams pass through the aperture. The switching method is carried out by a micro mechanical device comprising a substrate having a surface formed with a flat mirror and an aperture. An actuator formed of a shape memory alloy material operates to move the mirror between a neutral position where the mirror reflects input light beams and an activated position where it is nonreflective to switch the output beam path. In one embodiment a shape memory alloy bimorph latch operates in conjunction with the actuator so that the reflective and nonreflective positions of the mirror are bistable. --

Delete column 7, line 31 to and including column 7, line 60.

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,470,108 B1
DATED        : October 22, 2002
INVENTOR(S)  : A. David Johnson It is certified that error appears in the above-identified patent and that said Letters Patent is hereby corrected as shown below:

Column 7,
Lines 31 to 55, substitute claims 1 and 2 with the following claims:

-- 1. A method of fabricating an optical switching device comprising the steps of providing a substrate formed of a crystalline material comprising at least one facet which has a planar surface, applying a coating of a reflective material on an area of the surface to form a mirror, providing a light source which directs a light beam along an input path, mounting the substrate for positioning responsive to an elastic restoring force in a neutral position where the substrate is free of any force other than gravity and where the mirror is in register with the input path with the beam being reflected from the mirror along a first output path, providing an opening in the mirror, and mounting the substrate for repositioning responsive to an actuating force from the neutral position to an other position where the input beam passes through the opening along a second output path.

2. A method of fabricating an optical switching device comprising the steps of providing a substrate formed of a crystalline material and having at least one facet which has a planar surface, applying a flat coating of a reflective material on an area of the surface to form a mirror, providing a light source which directs a light beam along an input path, mounting the substrate for movement to and from a position where the mirror is in register with the input path and the light beam is redirected from the mirror along an output path, forming an aperture through the mirror and substrate, and mounting the substrate for movement to and from an other position where the aperture is in register with the input path and the light beam passes through the aperture along an other output path. --

UNITED STATES PATENT AND TRADEMARK OFFICE
CERTIFICATE OF CORRECTION

PATENT NO.   : 6,470,108 B1
DATED        : October 22, 2002
INVENTOR(S)  : A. David Johnson It is certified that error appears in the above-identified patent and that said Letters Patent is hereby corrected as shown below:

<u>Column 7,</u>
Lines 56 to 60, substitute claim 3 with the following claims:

3. A method of fabricating an optical switching device comprising the steps of providing a substrate formed of a crystalline material and having at least one facet which has a planar surface, applying a flat coating of a reflective material on an area of the surface to form a mirror, providing a light source which directs a light beam along an input path, mounting the substrate for movement to and from a position where the mirror is in register with the input path and the light beam is redirected from the mirror along an output path, forming flat coatings of the reflective material on a plurality of discrete areas of the surface to define a plurality of mirrors, providing a plurality of the light sources which each direct light beams along separate input paths, and mounting the substrate for movement to the other position where the mirrors are in register with respective ones of the input paths and the light beams are redirected along respective output paths.

Signed and Sealed this

Nineteenth Day of August, 2003

JAMES E. ROGAN
*Director of the United States Patent and Trademark Office*